United States Patent
Abbasi et al.

(10) Patent No.: US 10,488,120 B2
(45) Date of Patent: Nov. 26, 2019

(54) AIR COOLING DAY CYCLE-BASED PROCESSING AND SYSTEMS

(71) Applicant: GAS TECHNOLOGY INSTITUTE, Des Plaines, IL (US)

(72) Inventors: Hamid Abbasi, Naperville, IL (US); David Cygan, Villa Park, IL (US); Aleksandr Kozlov, Buffalo Grove, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 7 days.

(21) Appl. No.: 15/434,743

(22) Filed: Feb. 16, 2017

(65) Prior Publication Data

US 2018/0231331 A1   Aug. 16, 2018

(51) Int. Cl.
| | |
|---|---|
| F28D 20/00 | (2006.01) |
| F28D 20/02 | (2006.01) |
| F28B 1/02 | (2006.01) |
| F28F 27/00 | (2006.01) |

(52) U.S. Cl.
CPC ............ *F28D 20/00* (2013.01); *F28B 1/02* (2013.01); *F28D 20/0056* (2013.01); *F28D 20/02* (2013.01); *F28F 27/00* (2013.01)

(58) Field of Classification Search
CPC ........ F28D 17/005; F28D 17/04; F28D 19/02; F28D 20/0056; F28D 2021/0045; F24F 2005/0032
USPC .............................................. 165/10, 104.14
See application file for complete search history.

(56) References Cited

U.S. PATENT DOCUMENTS

| | | | |
|---|---|---|---|
| 1,509,566 A * | 9/1924 | Price | F28D 7/06 165/158 |
| 3,981,355 A * | 9/1976 | Squires | B01J 8/0285 165/104.16 |
| 4,307,773 A * | 12/1981 | Smith | F28D 19/02 165/104.16 |
| 4,361,182 A * | 11/1982 | Michalak | B01J 8/1836 165/10 |
| 4,598,766 A * | 7/1986 | Michalak | F28D 19/02 165/104.16 |
| 5,355,688 A * | 10/1994 | Rafalovich et al. | F24D 11/0214 62/117 |
| 2013/0220306 A1* | 8/2013 | Haider et al. | F28C 3/16 126/620 |
| 2014/0000840 A1* | 1/2014 | Yang | F24F 5/001 165/59 |

(Continued)

OTHER PUBLICATIONS

Molerus, O. et al., "Heat Transfer Mechanisms in Bubbling Fluidized Beds," Heat Transfer in Fluidized Beds, First Edition, 1997, Chapter 4 (2 pp.).

(Continued)

*Primary Examiner* — Allen J Flanigan
(74) *Attorney, Agent, or Firm* — Pauley Erickson & Kottis

(57) ABSTRACT

Processes and systems applying day cycle temperature changes in conjunction with cool storage are provided. A thermal energy storage material is placed in heat transfer communication with lower temperature nighttime air resulting in a cooled thermal energy storage material. The cooled thermal energy storage material is subsequently utilized to cool an item such as a supply of higher temperature air, such as daytime air, or a cooling medium.

23 Claims, 5 Drawing Sheets

(56) References Cited

U.S. PATENT DOCUMENTS

2015/0316328 A1* 11/2015 Trainham et al. ........ F03G 6/00 165/10
2016/0231004 A1* 8/2016 Kawaji et al. .......... F25B 17/08

OTHER PUBLICATIONS

Electric Power Research Institute, "Viability and Impacts of Implementing Various Power Plant Cooling Technologies in Texas," Technical Report, Oct. 2012, Palo Alto, CA.

Ku, A.Y. et al., "Teh Energy-Water Nexus: Water Use Trends in Sustainable Energy and Opportunities for Material s Research and Developement," MRS Bull. 2012, 37 (4) 439-447.

Turchi, C.S. et al., "Water Use in Parabolic Trough Power Plants: Summary Results from WorleyPartsons' Analyses," NREL, Contract Technical Report, Dec. 2010, (108pp.).

Short, G. et al., "Towards a Technoeconomic Framework for Estimating Cost-Performance Tradeoffs for Power Plants Incorporating Transformative Dry-Cooling Technolgies," ASME 2016 Intl' Mechanical Engineering Congress and Exposition, Nov. 11-17, 2016, Phoenix Arizona (6 pp.).

Electric Power Research Institute, Shi, J. et al., Overview of NSF-EPRI Power Plant Dry Cooling Science and Technology Innovation Program (2014-2017), 2014 ASME Power Conf., Jul. 28-31, 2014, Baltimore, MD., (19 pp.).

Martin, C.L., "Novel Dry Cooling Technoolgy for Power Plants," EERC, Sunshot Concentrating Solar Power Program Review Apr. 23, 2013, Phoenix, AZ., (14pp.).

Mortensen, K., "Improved Performance of an Air Cooled Condenser (ACC) Using SPX Wind Guide Technology at Coal-Based Tehermoelectric Power Plants," SPX Cooling Tech, Inc., Mar. 31, 2011, Overland Park, KS., (47 pp.).

https://www.sbir.bov/sbiresearch/686600, "Enhanced Dropwise Condensation for Improved Dry Coiling Efficiency," DOE SBIR Program, Advanced Cooling Tech., Inc., Lancaster, PA., 2014, (4 pp.).

Ohadi, M.M., "Advanced Air Cooling Technologies," ARPA-e Alternative Power Plant Cooling Workshop, May 12-13, 2014, Chicago, IL., (18 pp.).

Raman, A.P., "Radiative Cooling-New Opportunitites & Enabling Technologies," ARPA-e Alternative Power Plant Cooling Workshop, May 12-13, 2014, Chicago, IL., (13 pp.).

* cited by examiner

AIR COOLING DAY CYCLE-BASED PROCESSING AND SYSTEMS

BACKGROUND OF THE INVENTION

Field of the Invention

This invention relates generally to air cooling and, more particularly, to air cooling advantageously applying day cycle temperature changes in conjunction with cool storage.

Discussion of Related Art

Dry cooling systems such as currently employed in power plants typically employ either an air cooled steam condenser or a combination of a conventional water cooled condenser and a secondary air-cooled water cooler in a closed loop system. While these systems eliminate the consumption and dissipation of the cooling water, current technologies have a number of drawbacks that must be addressed before they find wide adoption in or by industry. First, in dry cooling systems, the temperature of the condensate (or secondary cooling water) is limited by the ambient air temperature, which is always higher than the air wet bulb temperature. The higher temperature results in higher backpressures in turbines and lower power production efficiency compared to systems using cooling towers. The efficiency penalty can be as high as 10-15% in hot weather. Second, since the air side heat transfer coefficients and its heat capacity are much lower compared to water, air-cooled systems require a much larger condenser/secondary water cooler and large air fans adding significantly to the system costs and parasitic load respectively. Due to increased capital and operating costs and lost power production, the utilization of air-cooled condensers for thermoelectric power plants increases the levelized cost of electricity by approximately 5-9% relative to wet cooling.

Electric Power Research Institute (EPRI) and National Science Foundation (NSF) are funding a number of projects with the stated objective to develop transformative, disruptive, and game changing dry cooling technologies. While NSF is funding fundamental technology development, EPRI is funding applied research and development (R&D). Researchers are developing designs to increase the air side heat transfer coefficients and/or reduce the power production penalty. These include design enhancements such as the incorporation of nano-structures, porous structures, and vortex creation between fins and auto flutter. Other concepts use micro emulsion based absorption chillers, sorbents, hygroscopic working fluid, phase change materials as intermediate coolants, sweating boosted condensation (70% water reduction), steam ejectors, polymer strings and heat pipes with air side metal foil/foam. Research teams are investigating a wide range of concepts.

In addition, research is being conducted towards developing: 1) a concept using a hygroscopic working fluid to cool a steam condenser and dissipate the thermal energy directly to the atmosphere with no need for makeup water. The unique design of the system is said to enable integrated thermal storage in response to daily cycles in ambient temperature. This can be used to counteract the daytime performance degradation that hinders conventional dry cooling technology, 2) physical enhancements for an Air Cooled Condenser (ACC) to improve fan airflow in windy conditions. By removing cross-wind effects on ACC fans, wind guides can act to increase ACC performance, thereby increasing the overall efficiency of the power plant, and 3) enhancement of condensation heat transfer within condensing tubes using a cost effective coating method, thereby improving dry cooling efficiency with reductions in capital and operating costs.

None of the above technologies however have integrated cool transport/storage as described below relating to the subject development.

A variety of thermal storage technologies are commercially available or under development, mostly for the storage of heat at higher temperatures for later use. This is especially useful in stabilizing energy availability from solar thermal systems, which only generate thermal energy during the day. There does not appear to be any commercially available or emerging technologies specifically designed for application to steam condensers.

SUMMARY OF THE INVENTION

In accordance with one aspect or embodiment of the development, a day cycle based process employing air cooling is provided. For example, a thermal energy storage material is placed in heat transfer communication with lower temperature, e.g., nighttime, air resulting in a cooled thermal energy storage material. The cooled thermal energy storage material is subsequently utilized to cool an item such as a second supply of higher temperature air, e.g., daytime air, or a selected cooling medium.

In one particular embodiment, a process in accordance with one aspect of the subject development involves placing a thermal energy storage material in heat transfer communication with a first supply of air. The first supply of air is at a temperature of $T_1$ and such processing results in a cooled thermal energy storage material. The cooled thermal energy storage material is subsequently placed in heat transfer communication with an item selected from the group consisting of:

a second supply of air, the second supply of air being at a temperature of $T_2$, where $T_2 > T_1$, to form product air having a temperature $T_3$, where $T_3 < T_2$; and a cooling medium, the cooling medium being at a temperature of $T_4$, where $T_4 > T_1$, to form treated cooling medium having a temperature $T_5$, where $T_5 < T_4$.

In one embodiment wherein the cooled thermal energy storage material is placed in heat transfer communication with the second supply of air, the process further involves placing the product air in heat transfer communication with a third supply of air, the third supply of air being at a temperature of $T_6$, where $T_6 > T_3$, to form product air having a temperature $T_7$, where $T_7 < T_6$.

In accordance with another aspect of the development, an air cooling assembly is provided. The assembly includes a vessel having a containment section for containing a supply of thermal energy storage material. The vessel further includes a wall having a plurality of closeable discharge openings that when open place the thermal storage material of the containment section in flow communication with an associated heat exchange section. The heat exchange section includes an air introduction plenum to allow air to be introduced into the heat exchange section into contact with the thermal storage material to form a temperature-adjusted thermal storage material and an air discharge plenum to allow discharge of air from the heat exchange section after contact with the thermal storage material.

As used herein, references to "ambient air" are to be understood to generally refer to the surrounding outdoor air.

Other objects and advantages will be apparent to those skilled in the art from the following detailed description taken in conjunction with the appended claims and drawings.

DETAILED DESCRIPTION OF THE INVENTION

The subject development provides improved air cooling and, more particularly, provides air cooling processes and systems that can advantageously apply day cycle temperature changes in conjunction with cool storage.

In accordance with one aspect of the development, the lower ambient temperatures generally realized at nighttime are critically utilized in a process of cool storage, with tailored recovery of the cool energy during times of warmer ambient air, i.e., during daytime, to cool the ambient air. As will be appreciated by those skilled in the art and guided by the teachings herein provided, the resulting cooled ambient air can find many different and desired utilizations including, for example: 1) as condenser cooling air in either or both electric and fuel fired air conditioning and power generation units such as to increase their Coefficient of Performance (COP), 2) as turbine inlet air such as to increase the efficiency and throughput of the turbine, 3) in cooling steam condensate or in cooling steam condensate cooling water such as to lower temperatures and increase power generation efficiency in power plant applications, and 4) other applications that benefit from cool transport/storage or from cooling the ambient air or return air, for example, space conditioning.

Figure 1:
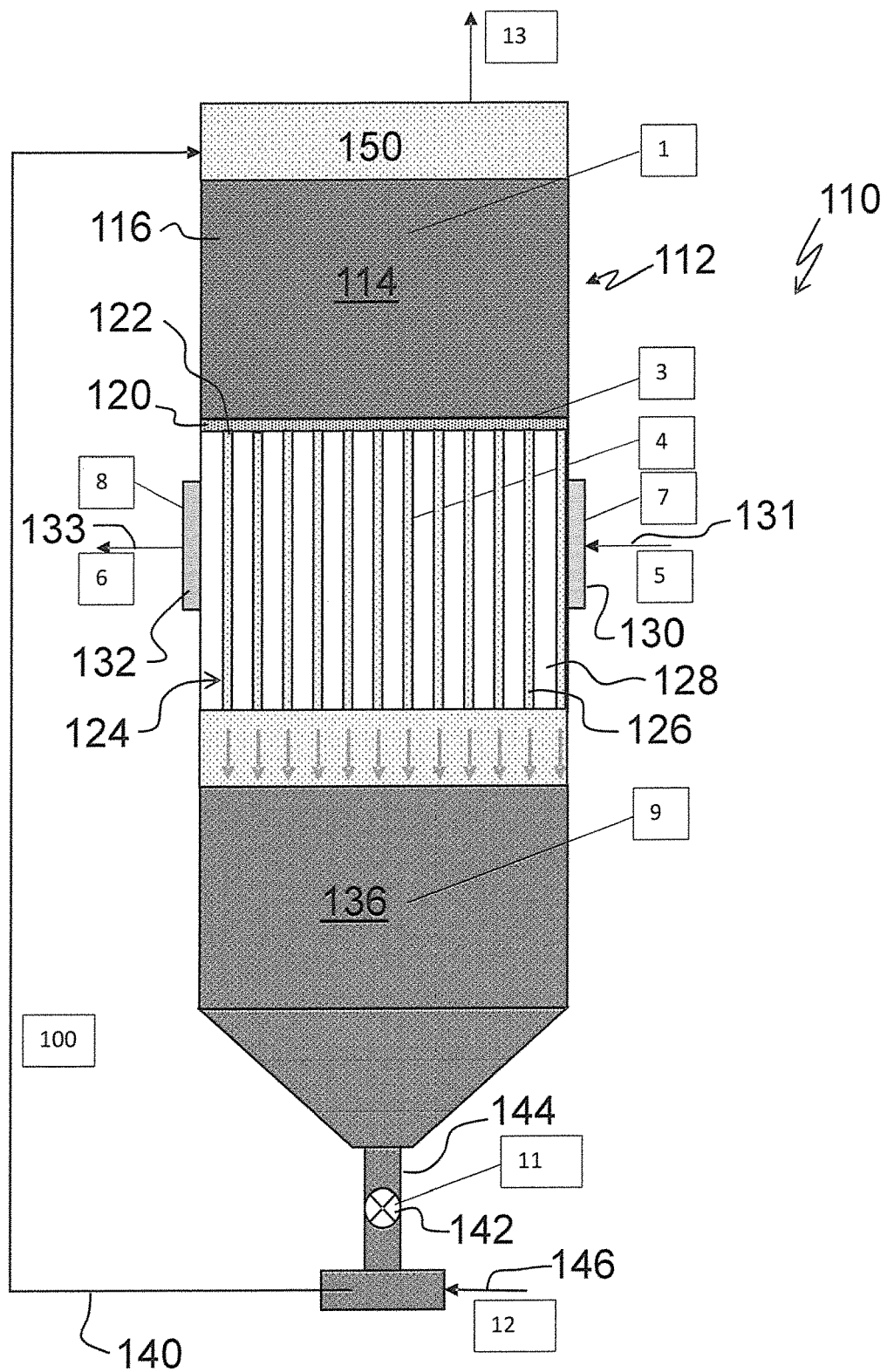
FIG. 1 is a simplified schematic of a day cycle process assembly in a cool storage mode in accordance with one aspect of the invention.

Turning to FIG. 1, there is shown a simplified schematic of a day cycle process assembly, generally designated by the referenced numeral 110, in a cool storage mode in accordance with one aspect of the invention.

The process assembly 110 includes a vessel 112. The vessel 112 is preferably insulated and includes a containment section 114 such as provided to contain a supply of thermal energy storage material 116. As will be appreciated, suitable thermal energy storage materials for use in the practice of the subject development can take various forms. In accordance with one embodiment, suitable thermal energy storage materials for use in the practice of the subject development can advantageously take a solid particle form, such as particles of glass, sand, plastic, minerals, composites, phase change material (e.g., encapsulated phase change material) or a combination thereof.

The vessel 112 has or includes a wall 120 such as in the form of a plate and such as at least in part delimiting the containment section 114 within the vessel. The plate or wall 120 has or includes a plurality of closeable discharge openings 122. When the discharge openings 122 are closed, thermal energy storage material 116 within the containment section 114 is therein retained. However, when the discharge openings 122 in the plate or wall 120 are open, the thermal energy storage material 116 is in transfer flow communication with an associated heat exchange section 124 within the vessel 112. As shown, the heat exchange section 124 can be disposed below the containment section 114 such that the thermal energy storage material 116 can appropriately gravitationally move or flow into the heat exchange section 124.

When desired, the discharge openings 122 in the plate or wall 120 are opened to allow the solid thermal energy storage material particles above plate 120 to flow into an associated heat exchange section 124. More particularly, in the assembly 110, the heat exchange section 124 includes a plurality of conveyance conduits 126 wherethrough the thermal energy storage material 116 is conveyed from the containment section 114. In the illustrated assembly 100, the conveyance conduits 126 have the form of cylindrical tubes. However, as will be appreciated by those skilled in the art and guided by the teachings herein provided, suitable conveyance conduits for use in the practice of the subject development can take various forms and thus the broader practice of the subject development is not necessarily limited to use with conveyance conduits of specific form or design. Further, the conveyance conduits 126 may incorporate surface enhancements (e.g., fins, studs, dimples or the like) and such as generally designated by the reference numeral 128, such to enhance heat transfer between air and thermal energy storage material particles inside the conveyance conduits.

The heat exchange section 124 includes or has an air introduction plenum 130 and an air discharge plenum 132 such as desirably disposed on opposite lateral sides thereof. The air introduction plenum 130 permits or allows air, such as signified by the arrow 131, to be introduced into the heat exchange section 124 and into heat exchange or heat transfer communication with the thermal storage material to form a temperature-adjusted thermal storage material. The air discharge plenum 132 in turn permits or allows discharge of air, such as signified by the arrow 133, from the heat exchange section 124 after contact with the thermal storage material. The plenums 130 and 132 can be utilized to desirably spread the flow air in, out, and through the heat exchange section 124 as well as to more specifically tailor or maximize contact between the air and the conduit tubes 126, and in turn the thermal energy storage material particles therein contained.

In normal practice, such as when the ambient air temperatures are relatively low, e.g., such as typically may occur during or at nighttime, the closeable discharge openings 122 in the wall or plate 120 are open to allow the thermal energy storage material solid particles above the plate 120 to flow into the conduit tubes 126 and cool ambient air is introduced via the air introduction plenum 130 and can desirably be blown across the tubes 126 to cool the thermal energy storage material particles contained within the tubes 126. The cooled thermal energy storage material particles can then move, flow or otherwise transport to a storage chamber section 136 such as disposed in a lower portion of the vessel 110, while warmer air, resulting from introduced air contacting the conduits, exits the vessel 110 via the discharge plenum 132.

In one preferred embodiment, the size or dimensions of the openings 122 in the wall or plate 120 can be desirably tailored or adjusted to allow control of the flow rate of the thermal energy storage material particles through the conduit tubes to achieve desired cooling of the particles. At a desired point in time, the stored cooler particles are transported back to the top of the vessel 112 such as through a pipe 140 and such as by opening a valve 142 disposed at an outlet 144 from the storage chamber 136 and using a carrier gas (represented by the arrow 146), such as air, for example, to carry the particles. If desired, and as shown, the gas containing the thermal energy storage material particles is introduced into a particle separation and/or a filtration section 150 such as disposed at an upper portion of the vessel 112 such as above or in a portion of the containment section 114. The particle separation and/or a filtration section 150 can desirably serve to filter or otherwise separated thermal energy storage material particles from the carrier gas. As may be desired, the gas may be recycled or vented and the captured particles may be recycled or discarded. The cycle may be repeated one or more times to achieve the desired level of cool storage (such as determined by temperature and amount of particles).

Figure 2:
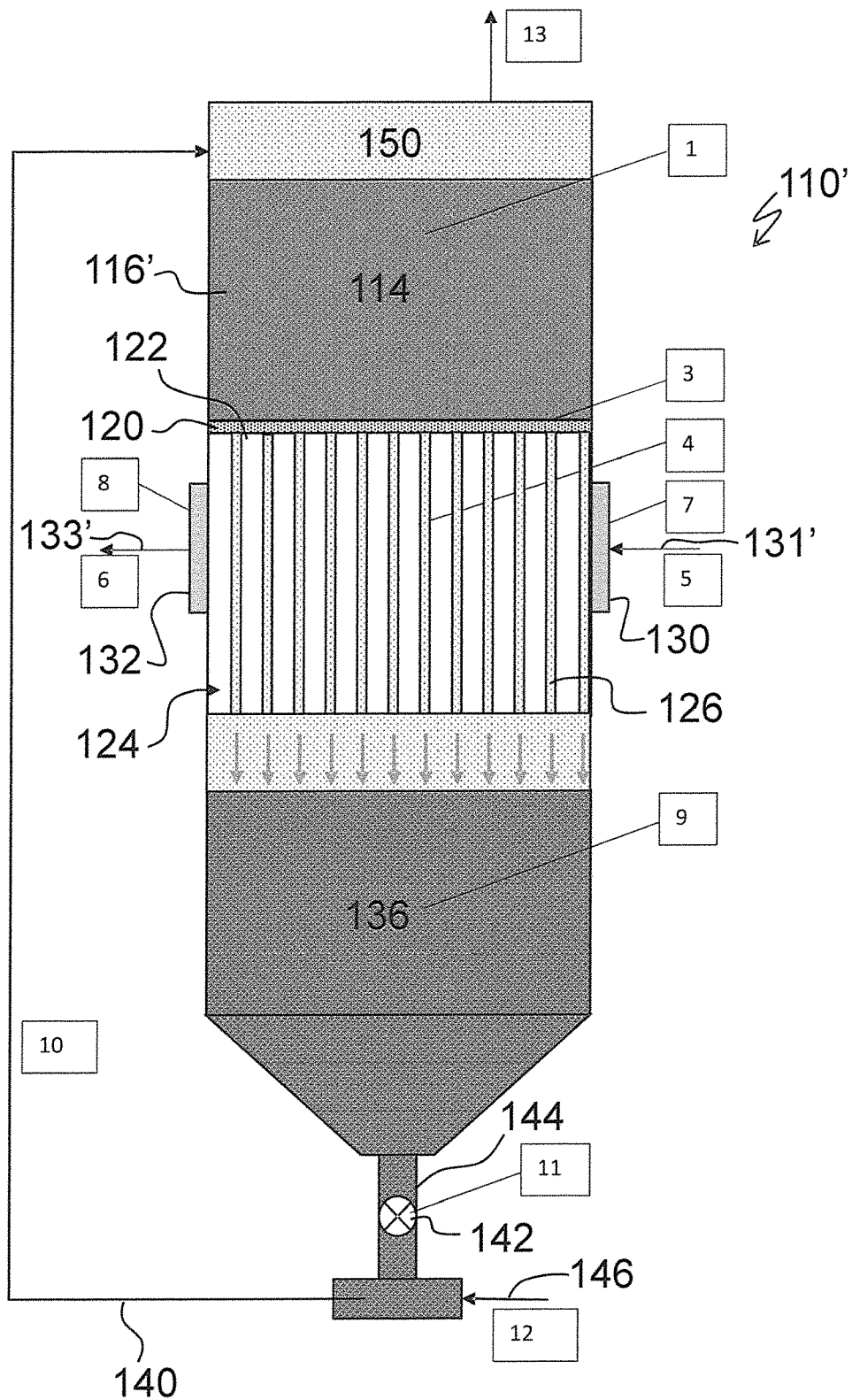
FIG. 2 is a simplified schematic of the process assembly shown in FIG. 1 but now in cooling mode of operation.

Turning now to FIG. 2, there is shown a simplified schematic of the process assembly shown in FIG. 1 (now designated by the reference 110') now shown in a cooling mode of operation such as when the ambient temperature is warmer such as during the day as opposed to the nighttime, as employed in FIG. 1.

More specifically, when the ambient temperature is warmer, such as during daytime, the openings 122 in the plate 120 are opened to permit or allow the cooled thermal energy storage material solid particles 116' now within the containment section 114 to move, flow or otherwise transport into the tubes 126 of the heat exchange section 124. The warmer daytime ambient air, such as signified by the arrow 131', is then introduced via the air introduction plenum 130 into the heat exchange section 124 and is blown across the tubes to cool the air. The now warmed thermal energy storage material particles drop to the bottom of the vessel 112, e.g., into the storage chamber section 136, and are stored, while cooled air, such as signified by the arrow 133', exits the vessel 112 such as via the air discharge plenum 132.

As will be appreciated by those skilled in the art and guided by the teachings herein provided, such cooled air can find use in a wide variety of applications such as described or identified above including and not necessarily limited to: 1) as condenser cooling air in both electric and fuel fired air conditioning and power generation units to increase their Coefficient of Performance (COP), 2) as turbine inlet air to increase the efficiency and throughput of a turbine, 3) in cooling steam condensate or in cooling steam condensate cooling water to lower temperatures and increase power generation efficiency in power plant applications, 4) other applications that benefit or can benefit from cool transport/ storage or from cooling of ambient air such as, for example, space conditioning and the like.

The plenums 130 and 132 can be utilized to spread the air flow and maximize contact between the air and the conduit tubes 126, and in turn the thermal energy storage material particles therein contained.

In one preferred embodiment, the size or dimensions of the openings 122 in the wall or plate 120 can be desirably tailored or adjusted to enhance, increase or otherwise desirably optimize cooling of the air such as in terms of parameters such as temperature of cooled air and the cooling duration, for example.

At a desired point in time, the stored warmer particles are transported back to the top of the vessel 112 such as through the pipe 140 and such as by opening the valve 142 disposed at the outlet 144 from the storage chamber 136 and using a carrier gas (represented by the arrow 146), such as air, for example, to carry the particles. If desired, and as shown, the gas containing the thermal energy storage material particles is introduced into the particle separation and/or filtration section 150 such as disposed at the upper portion of the vessel 112 such as above the containment section 114. The particle separation and/or a filtration section 150 can desirably serve to filter or otherwise separated thermal energy storage material particles from the carrier gas. As may be desired, the gas may be recycled or vented and the captured particles may be recycled or discarded. The cycle may be repeated one or more times to achieve the desired level of cool storage (such as determined by temperature and amount of particles).

Figure 3:
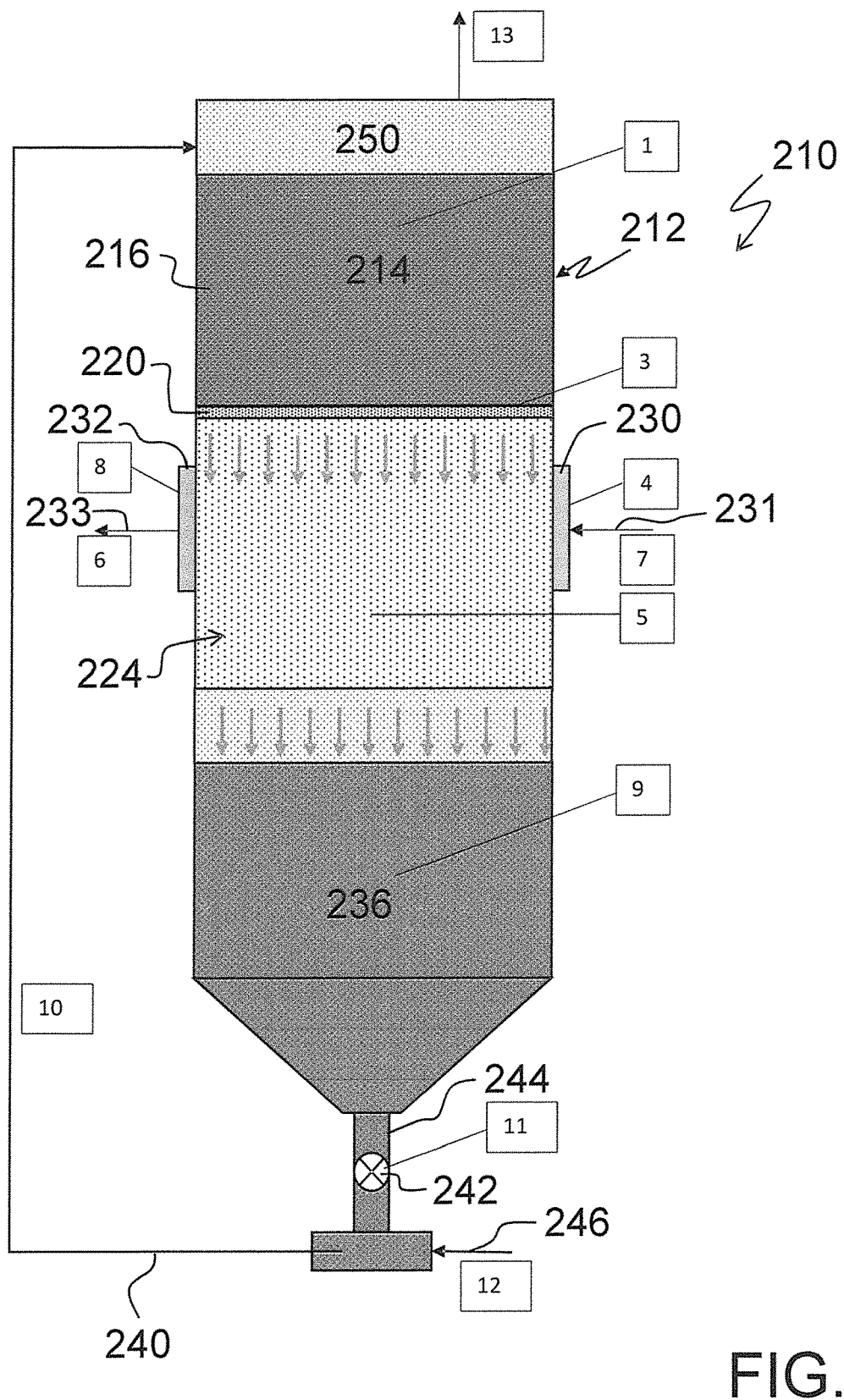
FIG. 3 is a simplified schematic of a process assembly in a cool storage mode in accordance with another aspect of the invention.

FIG. 3 is similar to FIG. 1 and shows a simplified schematic of a day cycle process assembly, generally designated by the referenced numeral 210, in a cool storage mode in accordance with one aspect of the invention. The process assembly 210 is generally similar to the process assembly 110 shown in FIG. 1 and described above.

The process assembly 210, similar to the process assembly 110, includes a vessel 212. The vessel 212 is preferably insulated and includes a containment section 214 such as provided to contain a supply of thermal energy storage material 216 such as described above. The vessel 212 has or includes a wall 220 such as in the form of a plate and such as at least in part delimiting the containment section 214 within the vessel. The plate or wall 220 similar to the plate or wall 120 has or includes a plurality of closeable discharge openings. When the discharge openings are closed, thermal energy storage material 216 within the containment section 214 is therein retained. However, when the discharge openings in the plate or wall 220 are open, the thermal energy storage material 216 is in transfer flow communication with an associated heat exchange section 224 within the vessel 212. As shown, the heat exchange section 224 can be disposed below the containment section 214 such that the thermal energy storage material 216 can appropriately gravitationally move or flow into the heat exchange section 224. When desired, the discharge openings in the plate or wall 220 are opened to allow the solid thermal energy storage material particles above plate 220 to flow into an associated heat exchange section 224.

A major difference between the process assembly 210 and the process assembly 110, however, is that the heat exchange section 224 does not include a plurality of conveyance conduits which contain the thermal energy storage material but rather relies on direct contact between air and the thermal energy storage material particles. With such direct contact heat exchange between the air and the thermal energy storage material particles, the thermal energy storage material particles provide or form a very large surface area that desirably results in rapid heat transfer rates between the particles and the air and can thus serve to reduce air side pressure drop.

The heat exchange section 224, similar to the heat exchange section 124 described above, includes or has an air introduction plenum 230 and an air discharge plenum 232 such as desirably disposed on opposite lateral sides thereof. Particle filters in the plenums 230 and 232 can be used to retain or keep the thermal energy storage material particles within the heat exchange section 224 and thus within the vessel 212.

The air introduction plenum 230 permits or allows air, signified by the arrow 231, to be introduced into the heat exchange section 224 and into contact with the thermal storage material to form a temperature-adjusted thermal storage material. The air discharge plenum 232 in turn permits or allows discharge of air, signified by the arrow 233, from the heat exchange section 224 after contact with the thermal storage material. The plenums 230 and 232 can be utilized to desirably spread the flow air in, out, and through the heat exchange section 224.

In normal practice, such as when the ambient air temperatures are relatively low, e.g., such as typically may occur during or at nighttime, the closeable discharge openings 222 in the wall or plate 220 are open to allow the thermal energy storage material solid particles above the plate 220 to flow into the heat exchange section 224. Cool ambient air is introduced via the air introduction plenum 230 to cool the thermal energy storage material particles contained in the heat exchange section 224. The cooled thermal energy storage material particles can then move, flow or otherwise transport to a storage chamber section 236 such as disposed in a lower portion of the vessel 210, while warmer air, resulting from introduced air contacting the conduits, exits the vessel 210 via the discharge plenum 232.

At a desired point in time, the stored cooler particles are transported back to the top of the vessel 212 such as through a pipe 240 and such as by opening a valve 242 disposed at an outlet 244 from the storage chamber 236 and using a carrier gas (represented by the arrow 246), such as air, for example, to carry the particles. If desired, and as shown, the gas containing the thermal energy storage material particles is introduced into a particle separation and/or a filtration section 250 such as disposed at an upper portion of the vessel 212 such as above the containment section 214. The particle separation and/or a filtration section 250 can desirably serve to filter or otherwise separated thermal energy storage material particles from the carrier gas. As may be desired, the gas may be recycled or vented and the captured particles may be recycled or discarded. The cycle may be repeated one or more times to achieve the desired level of cool storage (such as determined by temperature and amount of particles).

Figure 4:
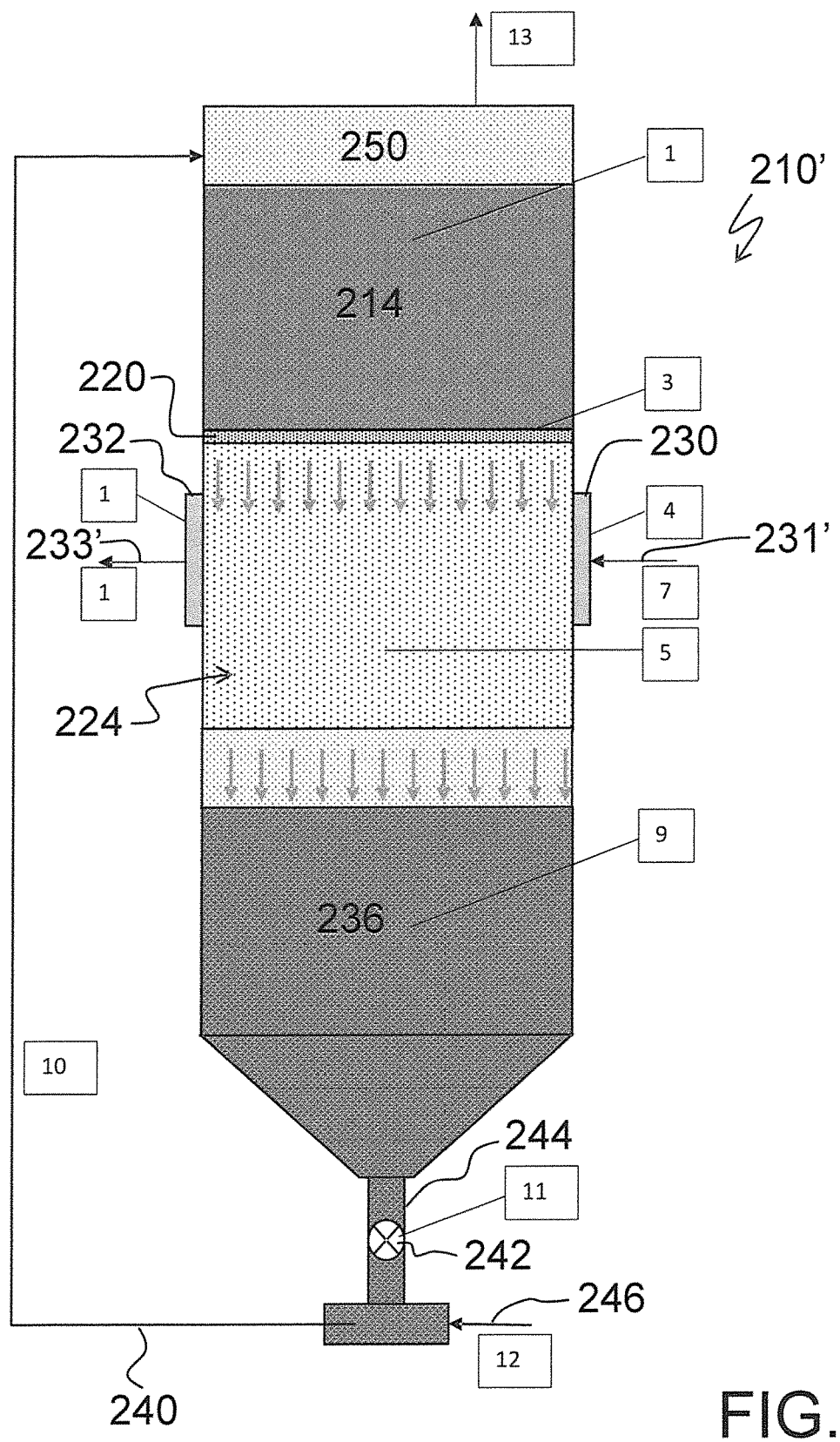
FIG. 4 is a simplified schematic of the process assembly shown in FIG. 3 but now in cooling mode of operation.

Turning now to FIG. 4, there is shown a simplified schematic of the process assembly shown in FIG. 3 (now designated by the reference 210') now shown in a cooling mode of operation such as when the ambient temperature is warmer such as during the day as opposed to the nighttime, as employed in FIG. 2.

More specifically, when the ambient temperature is warmer, such as during daytime, the openings 222 in the plate 220 are opened to permit or allow the cooled thermal energy storage material solid particles to move, flow or otherwise transport into the direct contact heat exchange section 224. The warmer daytime ambient air 231' is then introduced via the air introduction plenum 230 into the heat exchange section 224 and into contact with the cooled thermal energy storage material solid particles thus serving to cool the air and warm the thermal energy storage material solid particles. The now warmed thermal energy storage material particles drop to the bottom of the vessel 212, e.g., into the storage chamber section 236, and are stored, while cooled air 233' exits the vessel 212 such as via the air discharge plenum 232.

At a desired point in time, the stored warmer particles are transported back to the top of the vessel 212 such as through the pipe 240 and such as by opening the valve 242 disposed at the outlet 244 from the storage chamber 236 and using a carrier gas (represented by the arrow 246), such as air, for example, to carry the particles. If desired, and as shown, the gas containing the thermal energy storage material particles is introduced into the particle separation and/or filtration section 250 such as disposed at the upper portion of the vessel 212 such as above the containment section 214. The particle separation and/or a filtration section 250 can desirably serve to filter or otherwise separated thermal energy storage material particles from the carrier gas. As may be desired, the gas may be recycled or vented and the captured particles may be recycled or discarded. The cycle may be repeated one or more times to achieve the desired level of cool storage (such as determined by temperature and amount of particles).

In another embodiment, instead of cooling the ambient air, the cooled thermal energy storage material particles can desirably be mixed such as with a carrier gas, e.g., ambient air, and the resulting particle-gas mixture (also referred to herein as a "suspension") can be utilized in desired cooling applications such as to cool the condenser cooling water (or the steam condensate) in an indirect heat exchanger in, for example, power plant applications. The resulting warmer particles are then transported to the top of the vessel. The high suspension to heat exchanger surface heat transfer rates, as compared to air cooling, can desirably serve to reduce the size of the heat exchanger.

Figure 5:
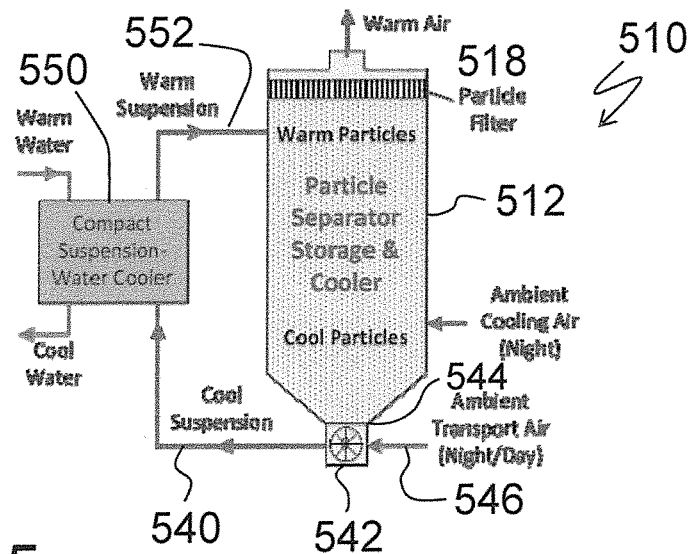
FIG. 5 is a simplified schematic of a process flow diagram in accordance with one aspect of the invention.

FIG. 5 illustrates an example of a process flow arrangement, generally designated by the reference numeral 510, of one such embodiment.

The process flow arrangement 510 includes a vessel 512 such as can be similar to either the vessels 212 and 312 described above, for example. The vessel 512 serves to cool, store and separate thermal energy storage material particles. To that end, the vessel 512 may suitably include one or more of a separation or containment section, a heat exchange section, a storage section and a filtration section, with only the particle filter 518 specifically shown.

Somewhat similar to the assemblies 110 and 210 described above, at a desired point in time, stored cooler particles from the vessel 512 are transported back to the top of the vessel 512 such as through a pipe 540 and such as by opening a valve 542 disposed at an outlet 544 from the vessel 512 and using a carrier gas (represented by the arrow 546), such as air, to form a mixture of air and particles, or a cool suspension containing the particles.

As shown in FIG. 5, the mixture of air and particles, or suspension, flows through a heat exchanger device 550 and the particle air flow loop in dilute to dense phase or as a bubbling bed. As shown and in accordance with one embodiment, the heat exchanger device 550 can suitably be in the form of a compact suspension water cooler:

The stream of the warm suspension, now designated by the reference numeral 552, from the heat exchanger device 550 (e.g., a suspension-water cooler or suspension-steam condenser) is directed to a combined or separate particle separator, storage and direct contact cooler 512, where the particles are separated by cyclone type separators and/or mechanical filtering, and then cooled during the night by direct contact with cooler nighttime air. The fines collected by the cyclone and or filters are either discarded or returned to the flow loop. The cooler particles are recycled back with additional ambient carrier (or transport) air as cold suspension to the compact suspension-water cooler. Although the carrier air may be warmer during the day, the suspension temperature will be close to the temperature of cooler particles because of the significantly higher heat capacity of the particles at the expected particle-air mass loading ratios of 25:1 to over 200:1. In the FIG. 5 example, warm particles are added at the top and cooled particles are withdrawn at the bottom continuously while the particle cooling is done only for a few, for example 8, hours during the night. Since the nighttime air is generally significantly cooler than daytime air, typically by about 20° F., the temperature gradient between the nighttime cooling air and warm particles is significantly higher enabling higher heat transfer rates and faster cooling of the particles. The use of nighttime cooler air for cooling the particles can significantly reduce condenser cooling water, and therefore the condensate temperatures resulting in increased power generation efficiency. Because direct contact heat transfer rates for gas to particles are very high, the cooling air may only need a few inches of contact with the particles to reach temperature equilibrium, which could minimize cooling air pressure drop and pumping power. Further, the use of particle suspension dramatically increases the air side heat transfer coefficient and reduces the heat exchanger size, pressure drop, and cooling 'fan' power consumption when compared to conventional air cooling of condensate or condenser cooling water. With integrated particle storage, the approach of using cooler air during the night to cool stored particles essentially eliminates the efficiency penalty often associated with air cooling systems for steam/refrigerant condensate or condenser cooling water during daytime temperature excursions or in warmer climates.

The concept can be used in both direct (using suspension directly in the steam/refrigerant condenser) and indirect (using suspension to cool condenser cooling water or using particles to cool condenser cooling air) arrangements, an indirect cooling approach being more suitable for retrofit of existing condensers. The subject development can minimize or even eliminate dissipation of water to the atmosphere from cooling towers while providing both cool storage and air cooling. The subject development further offers or affords possible advantages of or to:

1) Store and cool warm particles in ≤8 h during the night using cooler nighttime air for use in a suspension with ambient air for cooling condenser water 24 hours a day.

2) Provide very high heat transfer rates through direct contact of warm particles with nighttime cooler air.

3) Increase power production efficiency compared to conventional air cooled systems.

Those skilled in the art and guided by the teachings herein provided will understand and appreciate that the broader practice of the subject development is not necessarily limited to use with thermal energy storage material particles of specific or particular particle size as the concept can be used with a wide range of particle sizes such as ranging from submicron to millimeter diameter, for example.

A currently preferred particle size of thermal energy storage material particles for use in the practice of the subject development are particles whose size is in the range of 40 to 250 micron. The use of and practice with thermal energy storage material particles within this size range is or can be advantageous in establishing desired flow while also desirably providing or resulting in very high surface per unit volume values.

It is believed that practice and use of thermal energy storage material particles within this size range is or can be advantageous in establishing desired flow while also providing or resulting in a very high surface per unit volume.

A wide range of known and new techniques can be used to separate the particles from gas (e.g. cyclone separator, cartridge filters, baghouse) and to feed particles into the carrier fluid. These techniques are well established and practiced in petrochemical and other industries.

Flow loop design can incorporate single or multiple branches separating and combining as appropriate, one or more storage vessels can be used for either or both cold and warm storage of particles.

The filtering and/or feeding component can be either integrated with the vessel or built into a separate housing and connected to the vessel.

The transport and storage components are preferable insulated to minimize heat gain or losses where appropriate.

Figure 6:
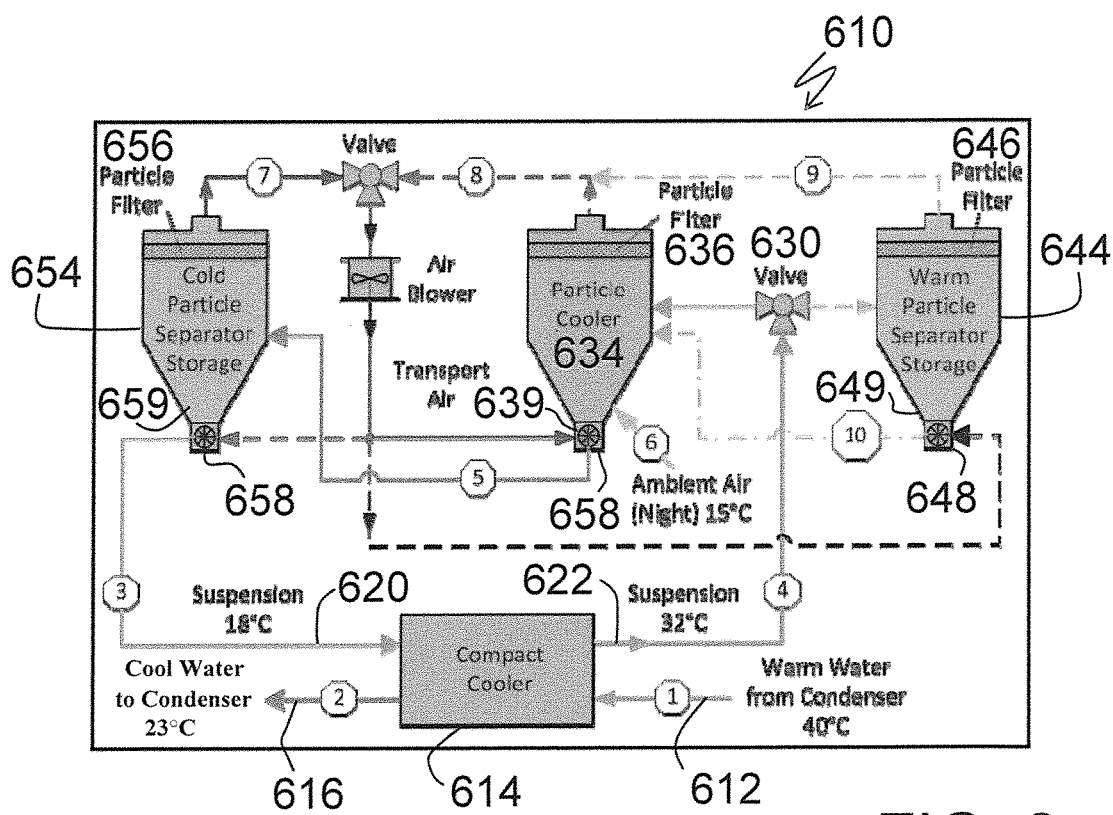
FIG. 6 is a simplified process flow diagram of a system in accordance with another aspect of the invention.

FIG. 6 illustrates a process flow diagram for a system, generally designated by the reference numeral 610, utilizing a suspension in accordance with one aspect of the subject development.

The system 610 serves to cool a stream 612, such as composed of warm water (e.g., 40° C.) from a condenser, via a compact cooler 614 to form a corresponding stream 616 of reduced temperature material, such as composed of cool water (e.g., 23° C.) to the condenser.

In the compact cooler 614, the stream 612 is cooled indirectly via a cool (e.g. 18° C.) stream 620 such as composed of a suspension of cooled thermal energy storage material solid particles and carrier gas, e.g., ambient air, such as described above, and such as resulting in a warm (e.g., 32° C.) stream 622 composed of the warmed suspension.

The material of the stream 622 can subsequently be appropriately processed such as via valve 630, a particle cooler vessel 634 such as including a particle filter 636, a particle release valve 638 and a gas outlet 639; a warm particle separator storage vessel 644 such as including a particle filter 646, a particle release valve 648, and a gas outlet 649; a cold particle separator storage vessel 654 such as including a particle filter 656, a particle release valve 658 and a gas outlet 659.

The system 610 may further include additional associated or complimentary piping and connections such as shown.

Table 1 shows results of heat balance and performance analysis listing temperatures, and heat and mass flow rates for the different streams for power plant applications.

|  | Stream # | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Fluid | Water | Water | Susp. | Susp. | Susp. | Cooling Air | Transport Air | | | Susp. |
| Time of operation (D—Day, N—Night) | D/N | D/N | D/N | D/N | N | N | N | N | D | N |
| Temperature, ° C. | 40 | 23 | 32 | 18 | 18 | 15 | 18 | 18 | 32 | 32 |
| Flow rate, kg/hr | 1012 | 1012 | 4552 | 4552 | 13665 | 71692 | 109 | 327 | 109 | 4552 |
| Heat flow, kW | 20 | | 20 | | 60 | 60 | — | — | — | 40 |

Based on these estimates, the subject development could cool the condenser water by an average 17° C. (from 40° C. to 23° C.), while the suspension temperature could increase by 14° C. (from 18° C. to 32° C.). The air blower in this example is installed downstream of the filters to allow use of standard blowers and minimize any adverse impacts of particle deposition or particle induced erosion on the blower. Higher pressure compressed air can also be used for transporting the particles through the flow loop.

The heat transfer coefficient between particles and gas is generally not large; however, the amount of heat transfer per unit mixture volume is extremely high due to the large interfacial area. Consequently, it is common to find that thermal equilibrium between particles and gas is reached quickly, within a very short distance from the point of gas injection. So much so that in many instances, for example in fluidized beds, isothermal conditions are assumed throughout the particle gas mixture.

In yet another embodiment, instead of storing cool energy in particles as discussed above, the cooler night time air is used to cool a static or moving permeable structure made from suitable materials and the cool energy stored in the structure is used to cool the warmer daytime air. The permeable structure is designed to minimize pressure drop for flowing air and volume of cool storage structure while maximizing available heat transfer surface area per unit of heat transferred. A wide variety of materials, such as sand, plastics, minerals, cement, encapsulated phase change materials and engineered substances, can be considered for the fixed structures to maximize the surface area and the heat transfer rates while minimizing overall cool storage system size, and pressure drops. The materials can be used in a wide range of arrangements such as loose pieces or rigid open structures, such as open cell foam or other permeable arrangements that promote good heat transfer and storage while keeping low pressure drop. Specific heat capacities of the material, both volumetric and mass are also important consideration to reduce the volume and mass respectively to achieve the same amount of cool storage.

The use of a cool particle suspension in accordance with an aspect of the subject development addresses key challenges hampering the use of conventional dry-cooling systems, namely the low air side heat transfer coefficient necessitating massive heat exchangers, and the penalty imposed by air cooling when ambient temperatures are high. Separation and direct contact cooling of warm suspension particles using cooler nighttime air reduces the suspension temperature to levels significantly below ambient air temperatures throughout the day, while keeping the charging time at ≤8 h. When used with particles or with alternate permeable structures, the use of nighttime cooler air enables cool storage and minimizes or eliminates the loss in production efficiency associated with air cooling systems.

The subject cool storage technology will be applicable to copper condensing tubes currently used in dry cooling systems by a cost-effective method, thus making the conversion to the more efficient condensation process attractive and affordable.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention. Those skilled in the art and guided by the teachings herein provided will understand and appreciate that the cooled thermal energy storage material can be used advantageously to cool any solid, liquid and/or gaseous materials that are at higher temperatures or that generate heat, by direct contact, indirectly or through an intermediary. Examples include return air to air conditioning systems, electronics, homes and buildings.

What is claimed is:

1. A process employing air cooling, the process comprising:
    gravitationally conveying a thermal energy storage material to place the thermal energy storage material in heat transfer communication with a first supply of air, the first supply of air being at a temperature of $T_1$, resulting in a cooled thermal energy storage material, and
    placing the cooled thermal energy storage material in heat transfer communication with an item selected from the group consisting of:
        a second supply of air, the second supply of air being at a temperature of $T_2$, where $T_2 > T_1$, to form product air having a temperature $T_3$, where $T_3 < T_2$; and
        a cooling medium, the cooling medium being at a temperature of $T_4$, where $T_4 > T_1$, to form treated cooling medium having a temperature $T_5$, where $T_5 < T_4$;
    wherein the placing of the thermal energy storage material in heat transfer communication with the first supply of air comprises the first supply of air moving in a direction transverse to the gravitationally conveyed thermal storage material and
    wherein the placing of the cooled thermal energy storage material in heat transfer communication with the selected item comprises the selected item also moving in a direction transverse to the gravitationally conveyed thermal storage material.

2. The process of claim 1 wherein the thermal energy storage material comprises particles of a solid material.

3. The process of claim 1 wherein the thermal energy storage material comprises a material selected from the group consisting of glass, sand, plastic, minerals, composites, phase change materials and combinations thereof.

4. The process of claim 1 comprising placing the cooled thermal energy storage material in heat transfer communication with a condenser cooling medium comprising condenser cooling air.

5. The process of claim 1 comprising placing the cooled thermal energy storage material in heat transfer communication with a condenser cooling medium comprising condenser cooling water.

6. The process of claim 1 wherein during said placing of the thermal energy storage material in heat transfer communication with the first supply of air, the thermal energy storage material is in direct contact with the first supply of air.

7. The process of claim 1 wherein during said placing of the thermal energy storage material in heat transfer communication with the first supply of air, the thermal energy storage material is in indirect contact with the first supply of air.

8. The process of claim 1 wherein the selected item is a cooling medium selected from the group consisting of condenser cooling water and steam condensate.

9. The process of claim 8 wherein a mixture of the cooled thermal energy storage material and a carrier fluid are in indirect heat exchange communication with the selected item.

10. The process of claim 9 wherein the carrier fluid comprises ambient air.

11. The process of claim 1 additionally comprising:
storing the cooled thermal energy storage material for a selected period of time prior to placing the cooled thermal energy storage material in heat transfer communication with the selected item.

12. The process of claim 11 wherein the selected period of time comprises a period of time less than a mean solar day.

13. The process of claim 11 additionally comprising conveying stored cooled thermal energy storage material from a storage chamber to a heat exchange section to contact a material to be cooled.

14. The process of claim 1 comprising placing the cooled thermal energy storage material in heat transfer communication with the second supply of air, the process further comprising:
placing the product air in heat transfer communication with a third supply of air, the third supply of air being at a temperature of $T_6$, where $T_6 > T_3$, to form product air having a temperature $T_7$, where $T_7 < T_6$.

15. The process of claim 1 carried out in an apparatus comprising a vessel including a containment section for containing a supply of thermal storage material, a heat exchange section vertically disposed below the containment section and wherein thermal storage material conveyed from the containment section is placed in heat transfer communication with a selected medium, and a wall separating the containment section from the heat exchange section by a wall, the wall having a plurality of closeable discharge openings that when open place the thermal storage material of the containment section in flow communication with the associated heat exchange section,
wherein the heat exchange section includes an inlet and an outlet disposed on opposite sides of the vessel for introduction and discharge of the selected medium therethrough.

16. A process employing air cooling, the process comprising:
providing a vessel including a containment section for containing a supply of thermal storage material, a heat exchange section disposed vertically below the containment section, and a wall separating the containment section from the heat exchange section, the wall having a plurality of closeable discharge openings that when open place the thermal storage material of the containment section in flow communication with the heat exchange section, the heat exchange section including an air introduction plenum disposed on a first lateral side of the vessel and an air discharge plenum disposed on a second lateral side of the vessel, the second lateral side being opposite the first lateral side;
opening the plurality of closeable discharge openings to place the thermal storage material of the containment section in flow communication with the heat exchange section;
introducing a first supply of air into the heat exchange section through the air introduction plenum, the first supply of air being at a temperature of $T_1$, resulting in a cooled thermal energy storage material; and
placing the cooled thermal energy storage material in heat transfer communication with an item selected from the group consisting of:
a second supply of air, the second supply of air being at a temperature of $T_2$, where $T_2 > T_1$, to form product air having a temperature $T_3$, where $T_3 < T_2$; and
a cooling medium, the cooling medium being at a temperature of $T_4$, where $T_4 > T_1$, to form treated cooling medium having a temperature $T_5$, where $T_5 < T_4$.

17. The process of claim 16 wherein the heat exchange section includes a plurality of conveyance conduits to contain the thermal storage material from the containment section, wherein upon said introducing of the first supply of air, the conveyance conduits are in direct contact with the first supply of air.

18. The process of claim 17 comprising enhancing heat transfer communication between the thermal storage material contained within the conveyance conduits and the first supply of air by inclusion of heat transfer surface enhancements on an outer surface of the conveyance conduits.

19. The process of claim 17 wherein heat transfer communication between the thermal storage material contained within the conveyance conduits and the first supply of air is enhanced by heat transfer surface enhancements selected from the group consisting of fins, studs, dimples and combinations thereof disposed on a surface of the conveyance conduits.

20. The process of claim 16 additionally comprising selectively controlling a flow rate of the thermal storage material through the closeable discharge openings by varying the size of the closeable discharge openings.

21. The process of claim 16 wherein prior to the placing of the cooled thermal energy storage material in heat transfer communication with selected item, the process additionally comprising:
gravitationally transporting the cooled thermal energy storage material to a storage chamber section within the vessel,
transporting the cooled thermal energy storage material from the storage chamber section to the containment section and
introducing the cooled thermal energy storage material from the containment section into the heat exchange section.

22. The process of claim 21 wherein the transporting of the cooled thermal energy storage material from the storage chamber section to the containment section comprises:
employing a carrier gas to convey the cooled thermal energy storage material from the storage chamber section to a separation section disposed within the vessel above the containment section, the separation section separating the cooled thermal energy storage material from the carrier gas.

23. A process employing air cooling, the process comprising:
gravitationally conveying a thermal energy storage material to place the thermal energy storage material in heat transfer communication with a first supply of air, the first supply of air being at a temperature of $T_1$, resulting in a cooled thermal energy storage material, and
placing the cooled thermal energy storage material in heat transfer communication with an item selected from the group consisting of:
a second supply of air, the second supply of air being at a temperature of $T_2$, where $T_2 > T_1$, to form product air having a temperature $T_3$, where $T_3 < T_2$; and a cooling medium, the cooling medium being at a temperature of $T_4$, where $T_4>T_1$, to form treated cooling medium having a temperature $T_5$, where $T_5<T_4$;

wherein the placing of the thermal energy storage material in heat transfer communication with the first supply of air comprises the first supply of air moving in a direction transverse to the gravitationally conveyed thermal storage material, the process carried out in an apparatus comprising a vessel including a containment section for containing a supply of thermal storage material, a heat exchange section vertically disposed below the containment section and wherein thermal storage material conveyed from the containment section is placed in heat transfer communication with a selected medium, and a wall separating the containment section from the heat exchange section by a wall, the wall having a plurality of closeable discharge openings that when open place the thermal storage material of the containment section in flow communication with the associated heat exchange section, wherein the heat exchange section includes an inlet and an outlet disposed on opposite sides of the vessel for introduction and discharge of the selected medium therethrough.

* * * * *